(12) United States Patent
Weng et al.

(10) Patent No.: US 8,803,843 B2
(45) Date of Patent: Aug. 12, 2014

(54) TOUCH PANEL AND TOUCH SENSING METHOD THEREOF

(75) Inventors: Ming-Chi Weng, Kinmen County (TW); Yun-Chih Chen, Taoyuan County (TW); Hung-Hsiang Chen, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 73 days.

(21) Appl. No.: 13/590,138

(22) Filed: Aug. 20, 2012

(65) Prior Publication Data

US 2013/0278548 A1 Oct. 24, 2013

(30) Foreign Application Priority Data

Apr. 18, 2012 (TW) .............................. 101113798 A

(51) Int. Cl.
*G09G 5/00* (2006.01)

(52) U.S. Cl.
USPC ...................... 345/174; 178/18.06; 178/18.07

(58) Field of Classification Search
CPC .......... G06F 3/044; G06F 3/046; G06F 3/047

USPC ......... 345/173, 174; 178/18.01, 18.03, 18.07, 178/18.06

See application file for complete search history.

(56) References Cited

U.S. PATENT DOCUMENTS

| 7,084,933 B2 | 8/2006 | Oh et al. |
| 7,755,616 B2 * | 7/2010 | Jung et al. ..................... 345/174 |
| 2010/0309170 A1 | 12/2010 | Chen et al. |

FOREIGN PATENT DOCUMENTS

| CN | 201107767 Y | 8/2008 |
| CN | 102243556 A | 11/2011 |
| CN | 102419655 A | 4/2012 |
| JP | 2000076014 A | 3/2000 |
| TW | M388014 | 9/2010 |

* cited by examiner

*Primary Examiner* — Regina Liang
(74) *Attorney, Agent, or Firm* — CKC & Partners Co., Ltd.

(57) ABSTRACT

A touch panel includes a substrate, a plurality of first traces, an insulation layer, a plurality of second traces, and a microcontroller. The first traces are disposed over the substrate, the insulation layer is disposed over the first traces, and the second traces are disposed over the insulation layer. The microcontroller is electrically connected to the first traces and the second traces, and is operable to control the first traces and/or the second traces so that the first traces and/or the second traces form open loops or closed loops. Furthermore, a touch sensing method is also disclosed herein.

13 Claims, 4 Drawing Sheets

TOUCH PANEL AND TOUCH SENSING METHOD THEREOF

RELATED APPLICATIONS

This application claims priority to Taiwan Application Serial Number 101113798, filed Apr. 18, 2012, which is herein incorporated by reference.

BACKGROUND

1. Field of Invention

The embodiments of the present invention relate generally to a panel and a sensing method, and more particularly, to a touch panel employing capacitive and electromagnetic touch sensing techniques and to a touch sensing method thereof.

2. Description of Related Art

In a conventional dual mode touch device, capacitive touch sensing technology and electromagnetic touch sensing technology are integrated in a liquid crystal display by forming a capacitive circuit and an electromagnetic antenna respectively on different sides of a glass substrate.

However, the above-mentioned integration requires two manufacturing processes to be performed on different sides of the glass substrate, which not only increases the cost and complexity of the manufacturing process, but also decreases the transmittance of the entire touch panel, thereby leading to a decrease in the brightness of the touch panel.

In view of the foregoing, there exist problems and disadvantages with the current display techniques that must be overcome. However, those skilled in the art have yet to find a solution. In order to solve or circumvent the above-mentioned problems and disadvantages, there is an urgent need in the related field to provide a more effective method for performing capacitance and electromagnetic manufacturing processes on different sides of a glass substrate, in which the method not only reduces the cost and complexity of the manufacturing process but also improves the brightness of the conventional two-layer structure.

SUMMARY

Thus, one aspect of the embodiment of the present invention is to provide a touch panel. The touch panel comprises a substrate, a plurality of first traces, an insulation layer, a plurality of second traces, and a microcontroller. The first traces are disposed on the substrate, the insulation layer is disposed on the first traces, and the second traces are disposed on the insulation layer. Each of the first traces comprises a first line and a second line, and further, the first line comprises a first terminal and a second terminal, and the second line comprises a first terminal and a second terminal. The second terminal of the first line is electrically connected to the second terminal of the second line.

In addition, each of the second traces comprises a third line and a fourth line, and further, the third line comprises a first terminal and a second terminal, and the fourth line comprises a first terminal and a second terminal. The second terminal of the third line is electrically connected to the second terminal of the fourth line. Moreover, the microcontroller is electrically connected to the first terminals of the first lines, the second lines, the third lines, and the fourth lines. The microcontroller is operable to control the second lines and/or the fourth lines so that the first traces and/or the second traces form open loops or closed loops.

In one embodiment of the present invention, the microcontroller is operable to receive a capacitance variation value through the first lines and/or the third lines when the open loops are formed, and the microcontroller operable to receive an electromagnetic signal through the first lines and/or the third lines when the closed loops are formed.

In another embodiment of the present invention, each of the first traces further comprises a first switch, and the first switch is electrically connected to the second line thereof in series. Each of the second traces further comprises a second switch, and the second switch is electrically connected to the fourth line thereof in series. In addition, the microcontroller is electrically connected to the first switch of each of the first traces and the second switch of each of the second traces, and the microcontroller is operable to control the first switch of each of the first traces and/or the second switch of each of the second traces so that each of the first traces and/or each of the second traces forms an open loop or a closed loop.

In yet another embodiment of the present invention, each of the first traces or each of the second traces is disposed so as to form one of a unilateral-type trace and a bilateral-type trace.

In still another embodiment of the present invention, the orientation of the first traces is perpendicular to the orientation of the second traces.

In yet another embodiment of the present invention, the first line is parallel to the second line in each of the first traces, and the distance between the first line and the second line in each of the first traces is about 1 mm to about 10 mm.

In still another embodiment of the present invention, the third line is parallel to the fourth line in each of the second traces, and the distance between the third line and the fourth line in each of the second traces is about 1 mm to about 10 mm.

In another aspect of the embodiment of the present invention, a touch sensing method is provided. The touch sensing method is employed in a touch panel. The touch panel comprises a substrate, a plurality of first traces, an insulation layer, and a plurality of second traces. The first traces are disposed on the substrate, the insulation layer is disposed on the first traces, and the second traces are disposed on the insulation layer. The touch sensing method comprises the following steps:

disposing the first traces to form open loops and disposing the second traces to form closed loops;

receiving a capacitance variation value through the first traces or an electromagnetic signal through the second traces;

determining whether the capacitance variation value or the electromagnetic signal has been received, and if the capacitance variation value has been received, disposing the second traces to form closed loops;

receiving the electromagnetic signal through the second traces; and determining whether the electromagnetic signal is received, and if the electromagnetic signal has been received, disposing the first traces and the second traces to form closed loops and performing an electromagnetic signal detecting and positioning process.

In one embodiment of the present invention, the method further comprises, after the step of determining whether the capacitance variation value or the electromagnetic signal has been received, if the electromagnetic signal has been received, disposing the first traces and the second traces to form closed loops and performing the electromagnetic signal detecting and positioning process.

In another embodiment of the present invention, the method further comprises, after the steps of receiving the electromagnetic signal through the second traces and subsequently determining whether the electromagnetic signal has been received, if the electromagnetic signal has not been received, disposing the first traces and the second traces to form open loops and performing a capacitance variation value detecting and positioning process.

As a result, the embodiments of the present invention provide a touch panel and a touch sensing method in which the microcontroller is operable to control a same set of traces to form open loops or closed loops, thereby allowing the touch panel of the embodiments of the present invention to be operated in a capacitive touch sensing mode or an electromagnetic touch sensing mode depending on actual requirements. In other words, from the perspective of structure, by employing common traces between the capacitive touch sensing mode and the electromagnetic touch sensing mode, aspects of the present invention improve problems such as expensive and complex manufacturing processes associated with conventional manufacturing methods in which an electromagnetic manufacturing process and a capacitance manufacturing process are carried out on different sides of a glass substrate. Also, this novel structure addresses the issue of reduced display brightness typically encountered with conventional panels adopting a two-layer structure resulting from the above-mentioned two manufacturing processes.

BRIEF DESCRIPTION OF THE DRAWINGS

The invention may be more fully understood by reading the following detailed description of the embodiments, with reference made to the accompanying drawings as follows.

DETAILED DESCRIPTION

The present invention is more particularly described in the following examples that are intended as illustrative only since numerous modifications and variations therein will be apparent to those skilled in the art. Various embodiments of the invention are now described in detail with reference to the drawings in which like numerals indicate like components throughout the views.

Figure 1:
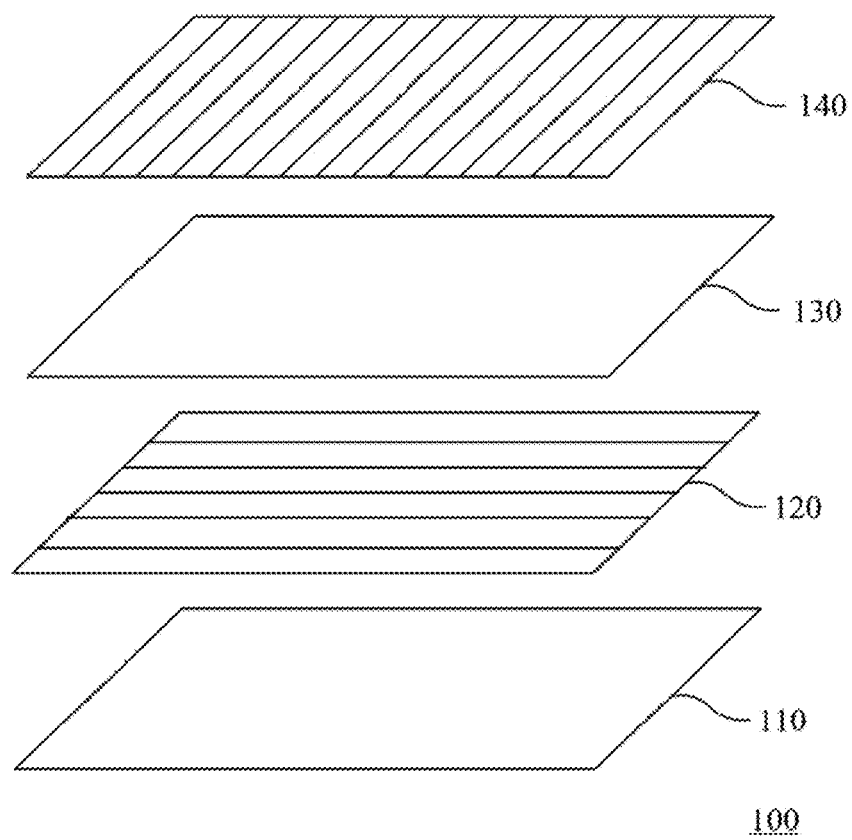
FIG. 1 schematically shows a touch panel according to embodiments of the present invention.

FIG. 1 schematically shows a touch panel 100 according to embodiments of the present invention. The touch panel 100 comprises a substrate 110, a plurality of first traces 120, an insulation layer 130, and a plurality of second traces 140. The first traces 120 are disposed on the substrate 110, the insulation layer 130 is disposed on the first traces 120, and the second traces 140 are disposed on the insulation layer 130.

The manner in which these layers are stacked together to form a laminate structure, such as the first traces 120 being disposed on the substrate 110, encompasses a configuration where the first traces 120 are disposed on and in direct contact with the substrate 110, as well as a configuration where one or more other layers are interposed between the first traces 120 and the substrate 110. This interpretation also applies to other layers of the touch panel 100. Those skilled in the art can selectively dispose the layers in the touch panel 100 depending on actual requirements without departing from the spirit of the present disclosure.

The first traces 120 and the second traces 140 can be manufactured with conventional materials. For example, indium tin oxide (ITO), metal, and other conductive materials can be employed as the main materials of the first traces 120 and the second traces 140. Those skilled in the art can selectively adopt various appropriate materials as the main materials of the first traces 120 and the second traces 140 depending on actual requirements. Moreover, the insulation layer 130 can be an over coat layer (OC layer), and the insulation layer 130 can be manufactured with conventional materials. For example, $SiO_2$ and other organic materials can be employed as the main materials of the insulation layer 130. Those skilled in the art can selectively adopt various appropriate materials as the main materials of the insulation layer 130 depending on actual requirements.

In one embodiment, as shown in FIG. 1, the orientation of the first traces 120 can be perpendicular to the orientation of the second traces 140. For example, the first traces 120 can be X direction traces in conventional capacitive panels or electromagnetic panels, and the second traces 140 can be Y direction traces in conventional capacitive panels or electromagnetic panels. However, the present invention is not intended to be limited in this regard, and those skilled in the art can selectively select the orientations of the first traces 120 and the second traces 140.

Figure 2:
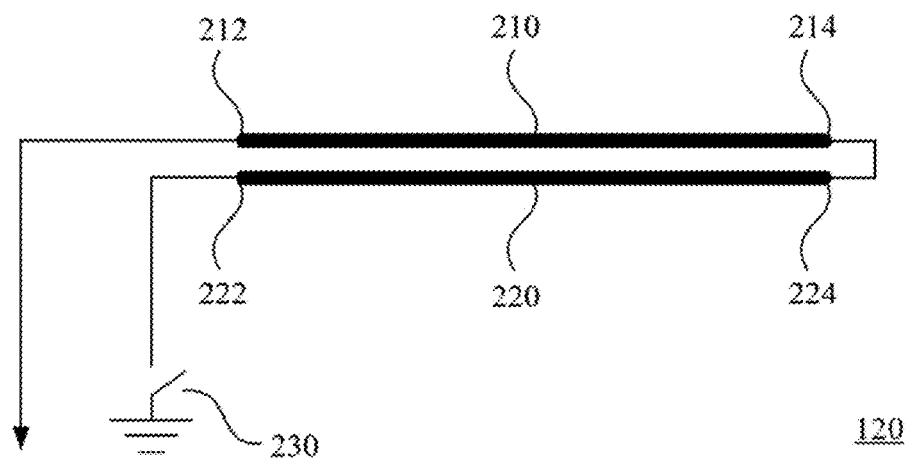
FIG. 2 schematically shows a basic structure of a trace of a touch panel according to embodiments of the present invention.

The basic structure of each of the first traces 120 is shown in FIG. 2 which schematically shows the basic structure of one of the first graces 120 of the touch panel 100 according to embodiments of the present invention. As shown in the figure, each of the first traces 120 comprises a first line 210 and a second line 220. Furthermore, the first line 210 comprises a first terminal 212 and a second terminal 214, and the second line 220 comprises a first terminal 222 and a second terminal 224. The second terminal 214 of the first line 210 is electrically connected to the second terminal 224 of the second line 220.

It is noted that the basic structure of each of the second traces 140 is similar to that of the first trace 120. That is, each of the second traces 140 comprises a third line (not shown) and a fourth line (not shown). Furthermore, each of the third line and the fourth line comprises a first terminal and a second terminal, and the dispositions of the third line and the fourth line correspond respectively to the dispositions of the first line 210 and the second line 220, and accordingly, a detailed description of the dispositions thereof is omitted herein.

Figure 6:
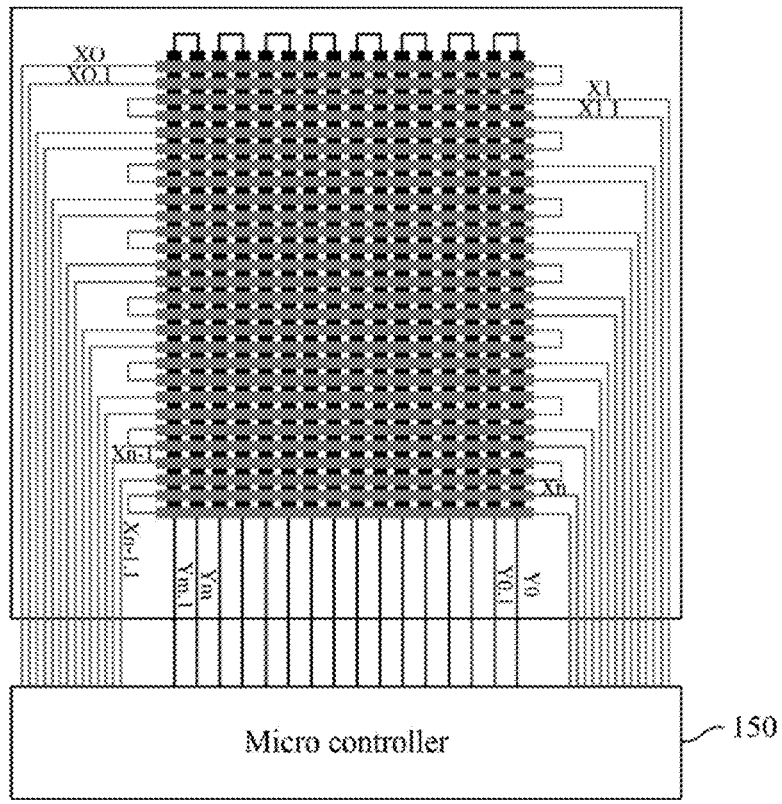
FIG. 6 schematically shows the overall layout of a plurality of first traces and second traces according to embodiments of the present invention.

In the present embodiment, the touch panel 100 comprises a microcontroller 150, as shown in FIG. 6 and described below. The first terminals of each of the first lines 210, the second lines 220, the third lines, and the fourth lines are electrically connected to the microcontroller 150. The microcontroller 150 is operable to control the second lines 220 and the fourth lines so that the first traces 120 and the second traces 140 form open loops or closed loops.

As mentioned above, the circuit as shown in FIG. 2 forms an open loop, and in this case, there is a capacitive structure formed between the first line 210 and the second line 220 for storing electric charge. When users touch the touch panel 100, the electric charge stored between the first line 210 and the second line 220 will be altered. The microcontroller 150 can receive a capacitance variation value from the first line 210, thereby allowing the touch panel 100 of the embodiment of the present invention to operate in a capacitive touch sensing mode. In addition, the third line and the fourth line can function to allow the touch panel 100 to operate in a capacitive touch sensing mode, and this is accomplished in a manner corresponding to the operation of the first line 210 and the second line 220, and accordingly, a detailed description regarding the capacitive touch sensing mode achieved through the third line and the fourth line is omitted herein.

Figure 3:
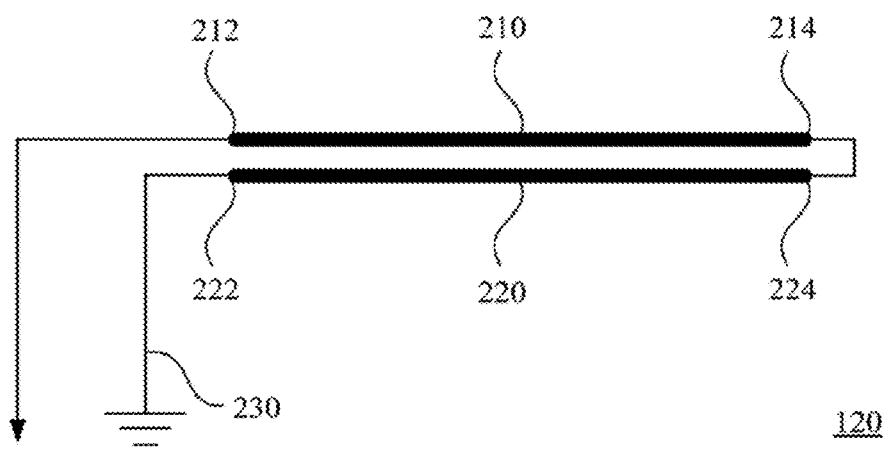
FIG. 3 schematically shows a basic structure of a trace of a touch panel according to embodiments of the present invention.

In the present embodiment, the circuit configuration of the touch panel 100 operating in an electromagnetic touch sensing mode is shown in FIG. 3. As shown in the figure, the circuit configuration herein forms a closed loop, and the entire first trace 120 forms an electromagnetic antenna loop. When users touch the touch panel 100, the microcontroller 150 can receive an electromagnetic signal from the first line 210, thereby allowing the touch panel 100 of the embodiment of the present invention to operate in the electromagnetic touch sensing mode. In addition, the third line and fourth line can function to allow the touch panel 100 to operate in the electromagnetic touch sensing mode, and this is accomplished in a manner corresponding to the operation of the first line 210 and the second line 220, and accordingly, a detailed description in this regard is omitted herein for the sake of brevity.

Compared with the prior manufacturing process in which an electromagnetic manufacturing process and a capacitance manufacturing process are respectively carried out on different sides of a glass substrate, the touch panel 100 of the embodiment of the present invention uses common traces for both the electromagnetic and capacitive touch sensing modes. In particular, the traces of the present touch panel are disposed on different sides of the insulation layer 130 based on their orientation rather than their function. For example, X direction traces can be disposed on one side of the insulation layer 130, while Y direction traces can be disposed on the other side of the insulation layer 130, and both the X and Y direction traces may be used in both operation modes.

Hence, the touch panel 100 of the embodiments of the present invention can control the same set of traces to form open loops or closed loops through the microcontroller 150 such that the touch panel 100 of the embodiments of the present can be operated in the capacitive touch sensing mode or the electromagnetic touch sensing mode depending on actual needs. In other words, the two common sets of traces disposed on different sides of the insulating layer 130 may be used to realize both the capacitive touch sensing mode and the electromagnetic touch sensing mode of the touch panel 100, thereby circumventing the conventional problems such as expensive and complex manufacturing processes, as well as decreased brightness encountered in conventional dual-mode touch panels.

Furthermore, in one embodiment, each of the first traces 120 can be controlled to form an open loop or a closed loop by introducing a first switch 230 into the each of the first traces 120, as shown in FIG. 2. In this case, the first switch 230 is electrically connected to the second line 220 in series. The microcontroller 150 is electrically connected to and controls the first switch 230 so that the first trace 120 can form an open loop or a closed loop. In addition, each of the second traces 140 also comprises a second switch (not shown) in such an embodiment. The second switch is electrically connected to the fourth line in series. The microcontroller 150 is electrically connected to and controls the second switch so that the second trace 140 can form an open loop or a closed loop.

Figure 4:
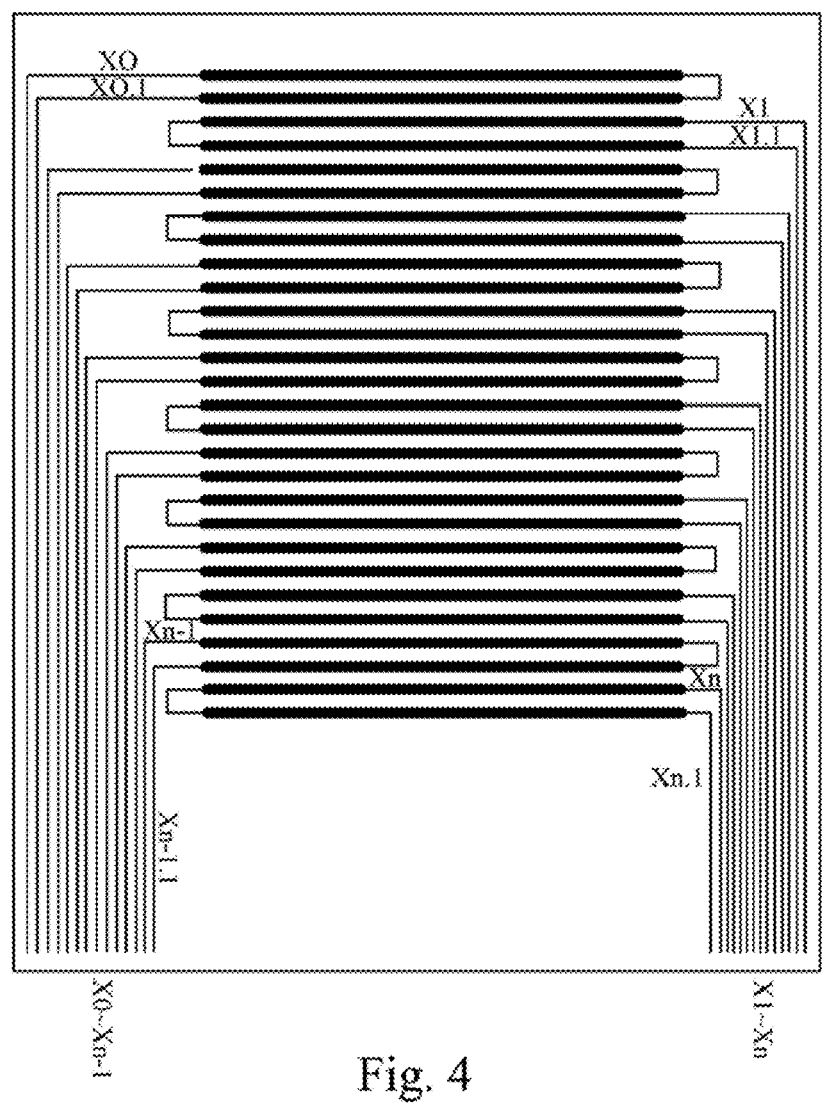
FIG. 4 schematically shows the layout of a plurality of first traces or second traces according to embodiments of the present invention.
Figure 5:
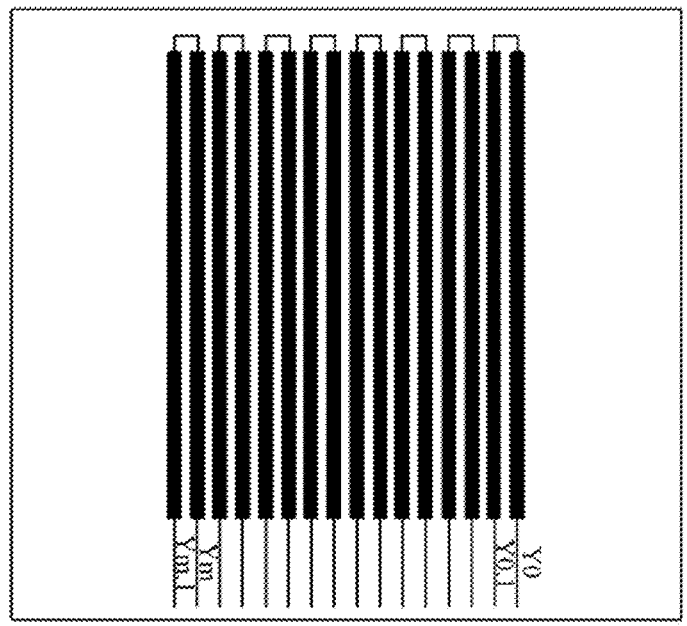
FIG. 5 schematically shows the layout of a plurality of first traces or second traces according to embodiments of the present invention.

FIG. 4 schematically shows the layout of a plurality of first traces 120 or second traces 140 according to embodiments of the present invention, and FIG. 5 schematically shows the layout of a plurality of first traces 120 or second traces 140 according to other embodiments of the present invention. As shown in FIG. 4 and FIG. 5, the basic structure of the first trace 120 or the second trace 140 as shown in FIG. 2 is utilized on one side of the insulation layer 130. Each of the first traces 120 or the second traces 140 can be disposed by employing a unilateral-type trace or a bilateral-type trace. Each of the first traces 120 or the second traces 140 of one embodiment of the present invention can be manufactured by adopting a bilateral-type trace configuration, so as to reduce the frame width of the substrate 110. However, the embodiment of the present invention is not intended to be limited in this regard, and those skilled in the art can selectively adopt various appropriate configurations for disposition of the traces depending on actual requirements.

FIG. 6 schematically shows the overall layout of a plurality of first traces 120 and second traces 140 according to embodiments of the present invention. The microcontroller 150 is electrically connected the first terminals of each of the first lines 210, the second lines 220, the third lines, and the fourth lines, and the manner of operation of the microcontroller 150 is as described above, and accordingly, a detailed description regarding the operation of the microcontroller 150 is omitted herein for the sake of brevity.

Moreover, the first line 210 is parallel to the second line 220 in each of the first traces 120, and the distance between the first line 210 and the second line 220 in each of the first traces 120 is about 1 mm to about 10 mm. Specifically, the distance between the first line 210 and the second line 220 can be 1, 2, 3, 4, 5, 6, 7, 8, 9, or 10 mm. Similarly, the third line is parallel to the fourth line in each of the second traces 140, and the distance between the third line and the fourth line in each of the second traces 140 is about 1 mm to about 10 mm. Specifically, the distance between the third line and the fourth line can be 1, 2, 3, 4, 5, 6, 7, 8, 9, or 10 mm. The purpose of such a configuration is to avoid erroneous touch detection when a finger touches the touch panel.

Figure 7:
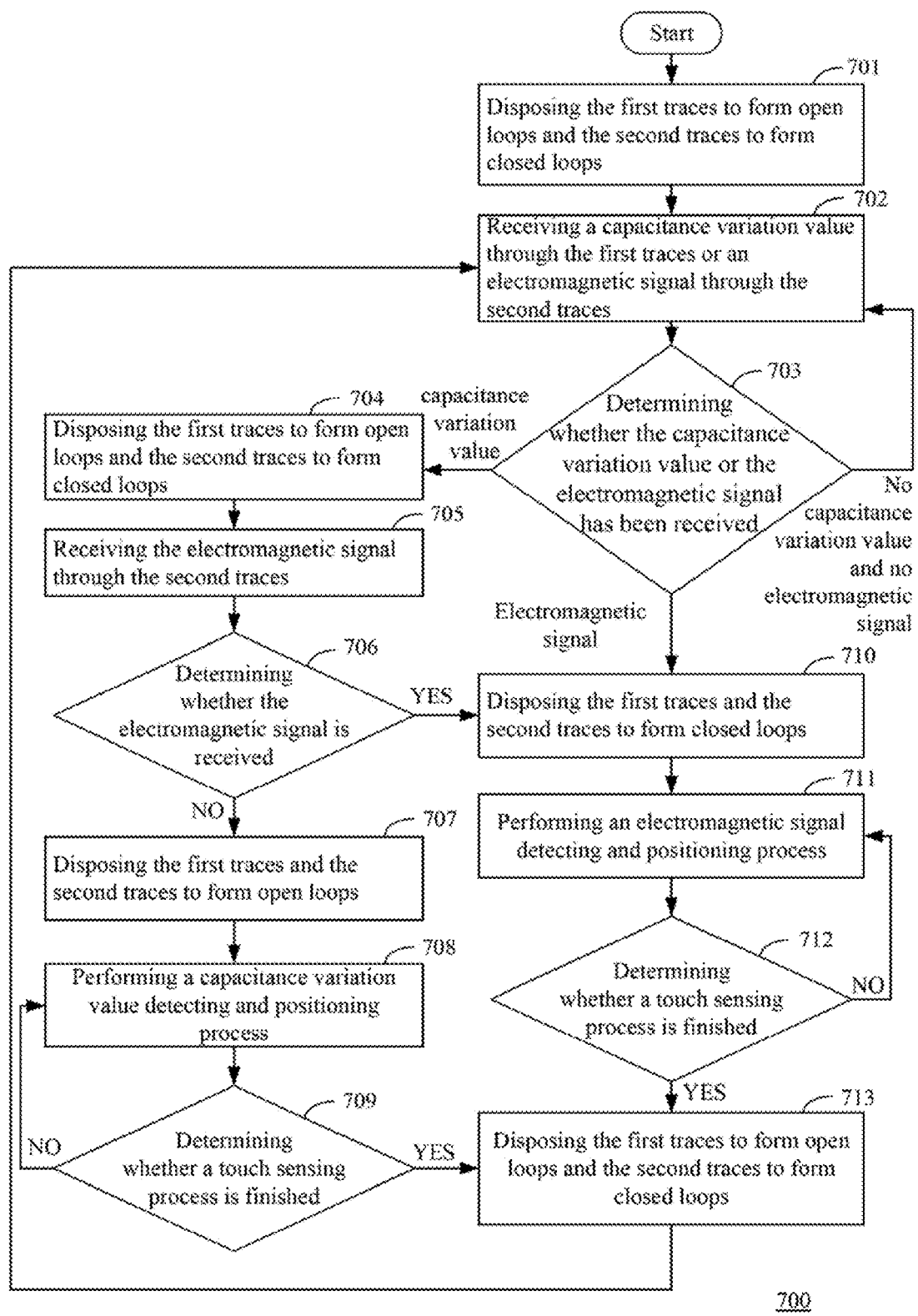
FIG. 7 schematically shows a flowchart illustrating a touch sensing method according to embodiments of the present invention.

FIG. 7 schematically shows a flowchart of a touch sensing method 700 according to embodiments of the present invention. The touch sensing method 700 is used in the touch panel 100 appearing in FIG. 1. The touch panel 100 comprises a substrate 110, a plurality of first traces 120, an insulation layer 130, and a plurality of second traces 140. With respective to configuration of the touch panel 100, the first traces 120 are disposed on the substrate 110, the insulation layer 130 is disposed on the first traces 120, and the second traces 140 are disposed on the insulation layer 130.

The touch sensing method 700 comprises a number of steps. In step 701, the first traces 120 are disposed to form open loops and the second traces 140 are disposed to form closed loops. Subsequently, in step 702, a capacitance variation value is received through the first traces 120 or an electromagnetic signal is received through the second traces 140. Next, in step 703, a determination is made as to whether what has been received is the capacitance variation value or the electromagnetic signal. Next, in step 704, if the capacitance variation value has been received, the second traces 140 are disposed to form closed loops. In step 705, the second traces 140 receive the electromagnetic signal. Next, in step 706, a determination is made as to whether the electromagnetic signal is received. If the electromagnetic signal is received, the first traces 120 and the second traces 140 are disposed to form closed loops in step 710, and an electromagnetic signal detecting and positioning process is performed in step 711.

In step 701, a microcontroller 150 may be used to dispose the first aces 120 to form open loops and the second traces to form closed loops.

Reference is now made to FIG. 2 in which the first trace 120 appearing therein is shown forming an open loop. In this case, a capacitive structure for storing electric charge is formed by the first trace 120. When users contact the touch panel 100, the electric charge stored in the first trace 120 is changed, and the microcontroller 150 can receive the capacitance variation value from the first trace 120 such that the touch sensing method 700 of the embodiment of the present invention can be implemented in a capacitive touch sensing mode. Reference is now made to FIG. 3 in which the first trace 120 appearing therein is shown forming a closed loop. In this case, all the second traces 140 form electromagnetic antenna loops. When users contact the touch panel 100, the microcontroller 150 can receive an electromagnetic signal from the second traces 140, so as to make the touch sensing method 700 of the embodiment of the present invention operate in an electromagnetic touch sensing mode.

In step 702, the capacitance variation value can be received by the microcontroller 150 through the first traces 120, or the electromagnetic signal can be received by the microcontroller 150 through the second traces 140

For example, the first traces 120 form capacitive structures due to the fact that the first traces 120 are disposed to form open loops, and hence the capacitance variation value can be received by the microcontroller 150 through the first traces 120. In addition, all the second traces 140 form electromagnetic antenna loops due to the fact that the second traces 140 are disposed to form closed loops and therefore the electromagnetic signal can be received by the microcontroller 150 through the second traces 140.

In step 703, the microcontroller 150 can determine whether what has been received is the capacitance variation value or the electromagnetic signal. In step 704, if the microcontroller 150 determines that the capacitance variation value has been received, the second traces 140 can be disposed to form closed loops. Subsequently, in step 705, the electromagnetic signal can be received by the microcontroller 150 through the second traces 140.

In step 706, the microcontroller 150 determines whether the electromagnetic signal received. Subsequently, in step 710, if the microcontroller 150 determines that the electromagnetic signal is received, the first traces 120 and the second traces 140 can be disposed to form closed loops, and the electromagnetic signal detecting and positioning process can be performed by the microcontroller 150 in step 711.

When a person holds a pen to write, he or she will lay his or her hand on an object or surface and then write using the support given by the object or surface. For the same reason, when a person holds an electromagnetic pen to perform input in an electromagnetic touch sensing mode, he or she may lay the writing hand on the touch panel 100. In such a scenario, the touch panel 100 may erroneously determine the touch event as being a capacitive touch event rather than an electromagnetic touch event.

Therefore the touch sensing method 700 according to embodiments of the present invention addresses the problem of erroneous determination by the touch panel 100 by a buffer mechanism provided by step 703 to step 706. Specifically, when the touch event is determined to be a capacitive touch event in step 703 (for example, in the case where a hand of a person touches the touch panel 100), the capacitance variation value detecting and positioning process step (step 708) is not performed immediately; rather, steps 704 to 706 are first performed to determine if the touch event is an electromagnetic touch event. Steps 704 to 706 are performed to determine if there is an electromagnetic pen in contact with the touch panel 100, and when the touch event is determined to be an electromagnetic touch event, steps 710 and 711 are performed to execute the electromagnetic signal detecting and positioning process.

In short, when step 703 is performed to determine that the touch event is a capacitive touch event, the capacitance variation value detecting and positioning process (step 708) is not executed immediately, and instead, steps 704 to 706 are performed to determine if the touch event is an electromagnetic touch event through a buffer mechanism, so as to avoid erroneous determination by the touch panel 100.

In one embodiment, after step 703 of determining whether what has been received is the capacitance variation value or the electromagnetic signal, if what has been received is the electromagnetic signal, the first traces and the second traces are disposed to form closed loops in step 710, and the electromagnetic signal detecting and positioning process is performed in step 711.

In step 703, if the microcontroller 150 determines that the electromagnetic signal has been received, in step 710, the first traces 120 and the second traces 140 are disposed to form closed loops. The electromagnetic signal detecting and positioning process can be performed by the microcontroller 150 in step 711.

Hence, the touch sensing method 700 of the embodiment of the present invention can control the same trace to form an open loop or a closed loop by the microcontroller 150 such that the touch panel 100 of the embodiments of the present invention can be operated in the capacitive touch sensing mode or the electromagnetic touch sensing mode depending on actual requirements. In other words, the same trace of the touch panel 100 can be used in both the capacitive touch sensing mode and the electromagnetic touch sensing mode, and hence, the same trace is present on one side of the substrate. As a result, the problem of high manufacturing costs and complex manufacturing processes due to having to perform an electromagnetic manufacturing process and a capacitance manufacturing process on both sides of a glass substrate can be avoided. Moreover, the problem of a reduction in the brightness of an image due to using a two-layer type structure formed through the above-mentioned two manufacturing processes is also addressed.

In another embodiment of the present invention, after step 706 of determining whether the electromagnetic signal is received, if the electromagnetic signal is not received, the first traces 120 and the second traces 140 are disposed to form open loops in step 707, and a capacitance variation value detecting and positioning process is performed in step 708.

In step 706, if the microcontroller 150 does not detect the electromagnetic signal, in step 707, the first traces 120 and the second traces 140 can be disposed to form open loops by the microcontroller 150; meanwhile, the capacitance variation value detecting and positioning process can be performed by the microcontroller 150 in step 708.

In one embodiment, the touch sensing method 700 further comprises steps 709 and 712 of determining whether a touch sensing process is finished. After performing the capacitance variation value detecting and positioning process of step 708, a determination as to whether a touch sensing process is finished can be performed by the microcontroller 150 in step 709. If the touch sensing process is not finished, step 708 is repeated, while if the touch sensing process is finished, step 713 is performed to dispose the first traces 120 and the second traces 140 in an initial state, that is to say, the first traces 120 are disposed to form open loops and the second traces 140 are disposed to form closed loops.

Moreover, after performing the electromagnetic signal detecting and positioning process of step 711, the microcontroller determines whether a touch sensing process is finished in step 712. If the touch sensing process is not finished, step 711 is performed, while if the touch sensing process is finished, step 713 is performed to dispose the first traces 120 and the second traces 140 in an initial state, that is to say, the first traces 120 are disposed to form open loops and the second traces 140 are disposed to form closed loops.

Those having skill in the art will appreciate that the touch sensing method 700 can be performed with software, hardware, and/or firmware. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Those skilled in the art will recognize that optical aspects of implementations will typically employ optically oriented hardware, software, and or firmware.

In addition, those skilled in the art will appreciate that each of the steps of the touch sensing method 700 is named in accordance with the function performed in said step, and such naming is merely used to describe the technology in the embodiment of the present invention in detail, but the present invention is not limited in this regard. Therefore, combining the steps of said method into one step, dividing the steps into several steps, or rearranging the order of the steps is within the scope of the embodiments in the present invention.

In view of the foregoing embodiments of the present invention, many advantages of the present invention are now apparent. The embodiments of the present invention provide the touch panel 100 and the touch sensing method 700 to control the same traces to form open loops or closed loops by the microcontroller 150 such that the touch panel 100 of the embodiments of the present can be operated in the capacitive touch sensing mode or the electromagnetic touch sensing mode depending on actual requirements. In other words, the same traces of the touch panel can be used in both the capacitive touch sensing mode and the electromagnetic touch sensing mode, and so the same traces are disposed on one side of the substrate. As a result, the problems of high manufacturing costs and complex manufacturing processes due to performing an electromagnetic manufacturing process and a capacitance manufacturing process on both sides of a glass substrate are addressed, as is the problem of reduction of brightness of an image due to utilizing a two-layer type structure formed through the above-mentioned two manufacturing processes.

In addition, the first traces 120 or the second traces 140 of the touch panel 100 of the embodiment of the present invention are realized through bilateral-type traces for reducing the frame width of the substrate 110. Furthermore, with respect to each trace 120 or 140, the distance between the first line 210 and the second line 220 is about 1 mm to about 10 mm, and the distance between the third line and the fourth line is about 1 mm to about 10 mm. Through such a configuration, erroneous touch detection that may result when fingers touch the touch panel can be avoided.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A touch panel, comprising:
   a substrate;
   a plurality of first traces disposed on the substrate, wherein each of the first traces comprises:
      a first line comprising a first terminal and a second terminal; and
      a second line comprising a first terminal and a second terminal, wherein the second terminal of the first line is electrically connected to the second terminal of the second line;
   an insulation layer disposed on the first traces;
   a plurality of second traces disposed on the insulation layer, wherein each of the second traces comprises:
      a third line comprising a first terminal and a second terminal; and
      a fourth line comprising a first terminal and a second terminal, wherein the second terminal of the third line is electrically connected to the second terminal of the fourth line; and
   a microcontroller electrically connected to the first terminals of the first lines, the second lines, the third lines and the fourth lines is operable to control the second lines and/or the fourth lines so that the first traces and/or the second traces form open loops or closed loops, wherein the microcontroller received a capacitance variation value through the first lines and/or the third lines when the open loops are formed, the microcontroller received an electromagnetic signal through the first lines and/or the third lines when the closed loops are formed.

2. The touch panel according to claim 1, wherein each of the first traces or each of the second traces is disposed so as to form one of a unilateral-type trace and a bilateral-type trace.

3. The touch panel according to claim 1, wherein the orientation of the first traces is perpendicular to the orientation of the second traces.

4. The touch panel according to claim 1, wherein the first line is parallel to the second line in each of the first traces, and the distance between the first line and the second line in each of the first traces is 1 mm to 10 mm.

5. The touch panel according to claim 1, wherein the third line is parallel to the fourth line in each of the second traces, and the distance between the third line and the fourth line in each of the second traces is 1 mm to 10 mm.

6. A touch sensing method for use in a touch panel, wherein the touch panel comprises a substrate, a plurality of first traces, an insulation layer and a plurality of second traces, wherein the first traces are disposed on the substrate, the insulation layer is disposed on the first traces, and the second traces are disposed on the insulation layer, wherein the touch sensing method comprises the following steps:
   disposing the first traces to form open loops and disposing the second traces to form closed loops;
   receiving a capacitance variation value through the first traces or receiving an electromagnetic signal through the second traces;
   determining whether the capacitance variation value or the electromagnetic signal has been received,
      if the capacitance variation value has been received, disposing the second traces to form closed loops;

receiving the electromagnetic signal through the second traces; and determining whether the electromagnetic signal is received, if the electromagnetic signal has been received, disposing the first traces and the second traces to form closed loops and performing an electromagnetic signal detecting and positioning process.

7. The method according to claim 6, further comprising, after the step of determining whether the capacitance variation value or the electromagnetic signal has been received:

if the electromagnetic signal has been received, disposing the first traces and the second traces to form closed loops and performing an electromagnetic signal detecting and positioning process.

8. The method according to claim 6, wherein further comprising, after the steps of receiving the electromagnetic signal through the second traces and subsequently determining whether the electromagnetic signal has been received:

if the electromagnetic signal has not been received, disposing the first traces and the second traces to form open loops and performing a capacitance variation value detecting and positioning process.

9. A touch panel, comprising:

a substrate;

a plurality of first traces disposed on the substrate, wherein each of the first traces comprises:
  a first line comprising a first terminal and a second terminal;
  a second line comprising a first terminal and a second terminal, wherein the second terminal of the first line is electrically connected to the second terminal of the second line; and
  a first switch electrically connected to the second line thereof in series;

an insulation layer disposed on the first traces;

a plurality of second traces disposed on the insulation layer, wherein each of the second traces comprises:
  a third line comprising a first terminal and a second terminal;
  a fourth line comprising a first terminal and a second terminal, wherein the second terminal of the third line is electrically connected to the second terminal of the fourth line; and
  a second switch electrically connected to the fourth line thereof in series; and a microcontroller electrically connected to the first switch of each of the first traces and the second switch of each of the second traces, wherein the microcontroller is operable to control the first switch of each of the first traces and/or the second switch of each of the second traces so that each of the first traces and/or each of the second traces forms an open loop or a closed loop.

10. The touch panel according to claim 9, wherein each of the first traces or each of the second traces is disposed so as to form one of a unilateral-type trace and a bilateral-type trace.

11. The touch panel according to claim 9, wherein the orientation of the first traces is perpendicular to the orientation of the second traces.

12. The touch panel according to claim 9, wherein the first line is parallel to the second line in each of the first traces, and the distance between the first line and the second line in each of the first traces is 1 mm to 10 mm.

13. The touch panel according to claim 9, wherein the third line is parallel to the fourth line in each of the second traces, and the distance between the third line and the fourth line in each of the second traces is 1 mm to 10 mm.

* * * * *